United States Patent [19]

Timmons

[11] Patent Number: 5,227,055
[45] Date of Patent: Jul. 13, 1993

[54] AQUACULTURE WATER TREATMENT SYSTEM INCLUDING COMBINED ROTATING BIOLOGICAL CONTACTOR AND EVAPORATIVE COOLER

[75] Inventor: Michael B. Timmons, Ithaca, N.Y.

[73] Assignee: Cornell Research Foundation, Inc., Ithaca, N.Y.

[21] Appl. No.: 820,780

[22] Filed: Jan. 15, 1992

[51] Int. Cl.⁵ .................................................. C02F 3/08
[52] U.S. Cl. ..................................... 210/151; 210/170; 210/195.1; 210/202; 210/150; 261/92
[58] Field of Search ............... 210/150, 151, 170, 194, 210/195.1, 202, 209; 261/92

[56] References Cited

U.S. PATENT DOCUMENTS

| | | |
|---|---|---|
| 3,116,712 | 1/1964 | Ogden et al. |
| 3,446,185 | 5/1969 | Cavanagh . |
| 3,589,518 | 6/1971 | Brebion .................... 210/150 |
| 3,661,262 | 5/1972 | Sanders . |
| 3,735,736 | 5/1973 | Yee et al. |
| 3,771,492 | 11/1973 | Doherty . |
| 3,827,559 | 8/1974 | Gass et al. |
| 3,837,492 | 9/1974 | Di Bello . |
| 3,842,804 | 10/1974 | Christensen et al. |
| 3,869,380 | 3/1975 | Torpey .................... 210/903 |
| 3,886,074 | 5/1975 | Prosser . |
| 3,997,443 | 12/1976 | Thissen . |
| 4,003,337 | 1/1977 | Moore . |
| 4,022,689 | 5/1977 | Kato et al. |
| 4,030,450 | 6/1977 | Hoult . |
| 4,038,945 | 8/1977 | Taborsky . |
| 4,043,299 | 8/1977 | Birkbeck et al. |
| 4,115,268 | 9/1978 | Thissen . |
| 4,137,172 | 1/1979 | Sako et al. |
| 4,182,267 | 1/1980 | Kominami et al. |
| 4,182,268 | 1/1980 | Berger . |
| 4,199,536 | 4/1980 | Yeagle . |
| 4,200,532 | 4/1980 | Iwatani et al. |
| 4,211,183 | 7/1980 | Hoult . |
| 4,261,930 | 4/1981 | Walker . |
| 4,330,408 | 5/1982 | McClure . |
| 4,333,893 | 6/1982 | Clyde . |
| 4,345,997 | 8/1982 | McConnell, Jr. et al. |
| 4,431,537 | 2/1984 | Hirota . |
| 4,522,714 | 6/1985 | Thissen . |
| 4,532,035 | 7/1985 | Fuchs et al. |
| 4,537,678 | 8/1985 | Thissen . |
| 4,549,962 | 10/1985 | Koelsch . |
| 4,649,000 | 3/1987 | Biesemeyer . |
| 4,668,387 | 5/1987 | Davie et al. |
| 4,669,420 | 6/1987 | Swanson . |
| 4,676,892 | 6/1987 | Grabowski . |
| 4,729,828 | 3/1988 | Miller . |
| 4,737,278 | 4/1988 | Miller . |
| 4,769,138 | 9/1988 | Frandsen . |
| 4,848,275 | 7/1989 | Swanson . |
| 4,897,356 | 1/1990 | Simpson et al. |
| 4,913,093 | 4/1990 | VanGorder . |
| 4,956,082 | 9/1990 | Choi . |
| 5,038,715 | 8/1991 | Fahs ......................... 119/3 |

Primary Examiner—Stanley S. Silverman
Assistant Examiner—Cynthia Nessler
Attorney, Agent, or Firm—Jones, Tullar & Cooper

[57] ABSTRACT

The present invention is directed to a closed cycle aquaculture system for fish rearing which includes as part of a water treatment subsystem a rotating biological contactor. The contactor nitrifies the contaminated water to remove toxic materials therefrom and also can be operated to maintain the temperature of the water near the wet-bulb temperature of the surrounding air when desirable.

5 Claims, 5 Drawing Sheets

AQUACULTURE WATER TREATMENT SYSTEM INCLUDING COMBINED ROTATING BIOLOGICAL CONTACTOR AND EVAPORATIVE COOLER

FIELD OF THE INVENTION

The present invention is directed to a water treatment system for use in systems for rearing fish. More specifically, the present invention is directed to a combined rotating biological contactor and evaporative cooler for use in treating recirculating water utilized in a water reuse aquaculture system.

DESCRIPTION OF THE PRIOR ART

In today's society, health-conscious consumers are increasingly searching for and purchasing foods which are low in fat content, calories and cholesterol. One food which has grown significantly in popularity as a result of this concern for health is fish.

As the demand for fish has increased, it has become evident that harvesting fish only through fishing in open water provides an expensive and limited supply. Researchers have correspondingly increased efforts directed to methods and devices for rearing fish in aquaculture systems for eventual consumption as food. These aquaculture systems rear fish from the hatching stage (called fry) to the fingerling stage, in which each fingerling weighs from three to eight grams, and through the grow-out phase wherein the fish are grown to the desired market weight.

Early aquaculture systems operated as continuous "flowthrough" systems in which water flowed into, through and out of the entire system, making a single pass therethrough. As research into aquaculture continued, however, it was discovered that water temperature and its stability has a profound effect on fish growth. For example, a rainbow trout with a 12-month growth cycle grows from a 5 gram fingerling to about 800 g in constant 70° F. water but grows only to 90 g in constant 50° F. water. Similar temperature effects have been shown for other aquatic species. Further, water temperature variation induces stress on fish which decreases performance of the system.

Since these early flow-through systems lacked an efficient and effective means for providing the necessary water temperature control, water reuse systems became popular. In these systems, the water which provides the environment for the growing fish is pumped between a fish rearing area and a treatment area where the water is treated to nitrify nitrogenous fish waste which can be toxic to fish depending on concentration. This type of system allows for accurate control of water environment parameters, including temperature.

Such a system conventionally includes a heat exchanger for water temperature control; however, this heat exchanger is, unfortunately, one of the greatest contributors to its cost. The costs incurred in purchasing or building the heat exchanger and expending the energy to produce the required temperature change in the water may be so large as to offset any satisfactory economic return from fish production. Further, the periodic cleaning of the heat exchanger often results in downtime of the system and other costs associated with finding substitute means for maintaining a temperature safe for the fish during heat exchanger maintenance. It is therefore desirable from an economic standpoint to develop a method and apparatus which will efficiently and effectively control the temperature of the water.

The nitrogenous waste mentioned above consists primarily of ammonia and nitrite which are conventionally removed by converting them to nitrates which are non-toxic to fish even at concentrations greater than 800 ppm. This conversion is achieved, in known manner, by biological treatment of the waste-containing water with nitrifying bacteria such as nitrosomonas sp. or nitrobacter sp. which are grown on a solid substrate or media. A popular biological treatment device is a rotating biological contactor, or RBC. Such a device usually consists of media which are continuously rotated through the waste water, thereby maintaining high oxygen levels in the bacterial films on the media and establishing a continuous flow of the contaminated water through at least a portion of the media.

The rotating biological contactors (RBCs) currently available have a number of drawbacks. For example, many present RBCs require a sophisticated and expensive support structure to properly contain and secure the media, as by encapsulation, while assisting in establishing a uniform flow therethrough. A more significant disadvantage of current RBCs is their susceptibility to biofouling or plugging. RBC media unavoidably become fouled during use due to waste or bacteria sloughing or flocculation. This fouling can result in undesirable phenomena such as non-uniform flow of the contaminated water through the media (with a resulting decrease in treatment efficiency) and/or unanticipated chemical reactions which may be detrimental or even lethal to fish. Furthermore, because of this fouling, the media must be regularly cleaned usually by flushing. Flushing of the contaminants from the media is a costly and time-consuming procedure, for the entire system must be conventionally shutdown so that the waste material is not simply flushed downstream or otherwise introduced into the aquaculture.

It is therefore highly desirable in a closed-cycle aquaculture system to utilize a rotating biological contactor which resists biofouling and operates for long periods of time without requiring cleaning or flushing. As discussed above, it is also highly desirable to accurately and efficiently control the temperature of the water in such a closed cycle aquaculture system.

BRIEF SUMMARY OF THE INVENTION

It is an object of the present invention to provide an improved closed cycle aquaculture system for rearing fish.

It is another object of the present invention to provide a closed cycle aquaculture system having reduced energy requirements, production costs and operational costs when compared to prior systems.

It is yet another object of the present invention to provide closed cycle aquaculture systems including a water treatment subsystem which maintains the water at a desired temperature with minimal energy and additional equipment costs.

It is still another object of the present invention to provide a closed cycle aquaculture system having a water treatment subsystem which includes a rotating biological contactor having a simplified yet effective media support.

It is still yet another object of the present invention to provide a closed cycle aquaculture system having a water treatment subsystem which includes a rotating biological contactor which has a low resistance to both air and water while rotating and which resists biofouling during waste treatment.

The present invention achieves these results by utilizing in an aquaculture system a rotating biological contactor which nitrifies dissolved nitrogenous waste in the contaminated water and additionally maintains the water at a temperature near the wet-bulb temperature of the surrounding air. The rotating biological contactor of the present invention includes a plurality of tubular contacting media mounted on a rotatable shaft and coated with bacterial film. The tubular media preferably have a void space of between about 88% and about 94% and a surface area of between about 30 ft²/ft³ and 50 ft²/ft³.

BRIEF DESCRIPTION OF THE DRAWINGS

While the novel features of the present invention are set forth with particularity in the appended claims, a full and complete understanding of the invention may be had by referring to the following detailed description of the preferred embodiment as set forth below and as illustrated in the accompanying drawings, in which:

DETAILED DESCRIPTION OF THE PREFERRED EMBODIMENTS

Figure 1:
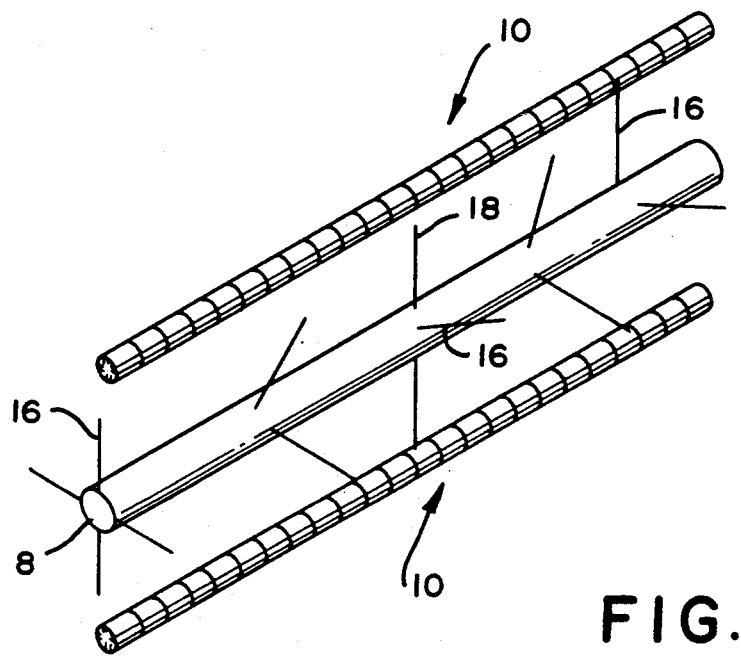
FIG. 1 is an exploded perspective view of the rotating biological contactor drum of the present invention with two representative tubular media.
Figure 2:
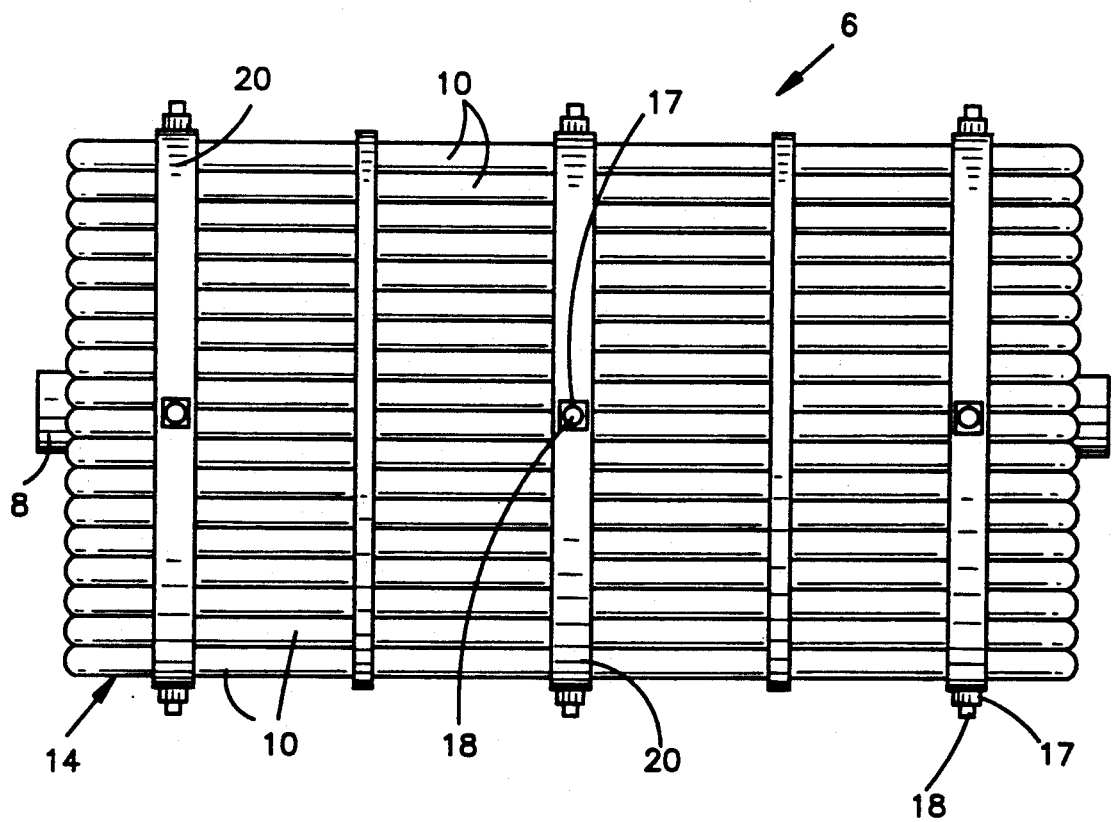
FIG. 2 is a side elevational view of the rotating biological contactor drum of the present invention, with all tubular media in place.
Figure 3:
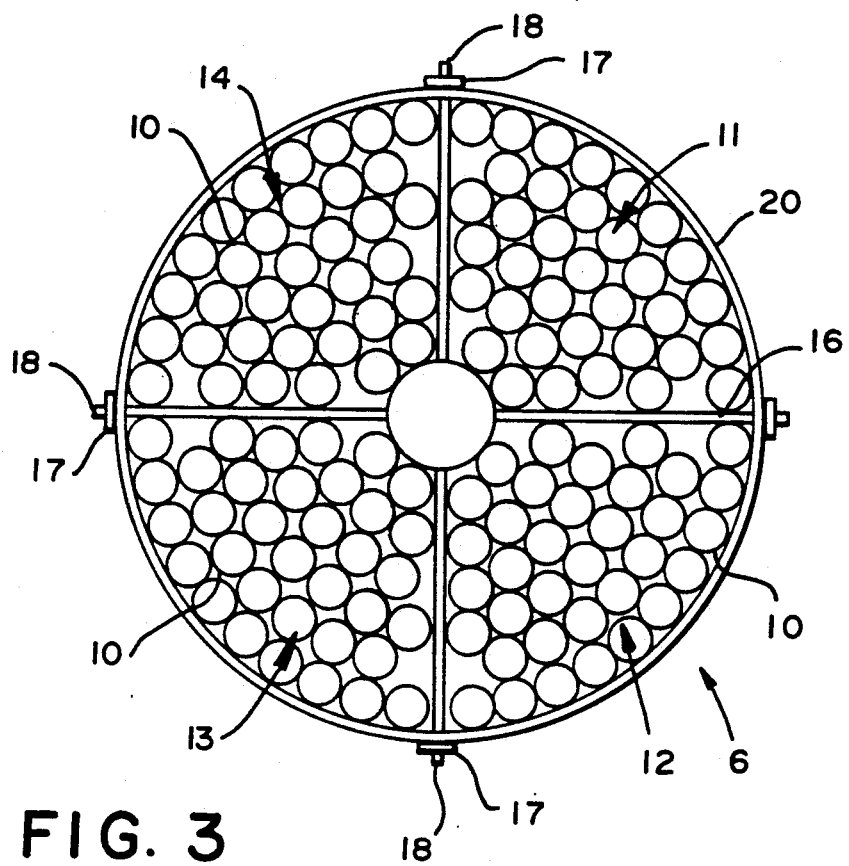
FIG. 3 is an end view of the rotating contactor drum with all tubular media in place.

As illustrated in FIGS. 1, 2 and 3, the rotating biological contactor drum 6 of the present invention includes a rotatable support shaft 8 having a longitudinal axis and a plurality of tubular media 10 supported on and rotatable with shaft 8 and having longitudinal axes extending substantially parallel to the longitudinal axis of the shaft 8. For simplicity, FIG. 1 illustrates only two tubular media; however, it is to be understood that between about 500 and about 550 2-inch diameter tubular media are preferably utilized. The tubular media 10 are arranged around shaft 8 in a closely packed arrangement and are held together by hoop bands 20 which extend around the tubular media 10.

Preferably, shaft 8 is approximately 4 feet in length, 4 inches in diameter and formed from a material strong enough to support the surrounding tubular media 10 and withstand the necessary applied rotational torque, such as stainless steel. These dimensions, however, may be varied as necessary to provide the desired extent of water treatment and necessary media support. For example, the length of shaft 8 may be from 1 to 16 feet depending on geometric installation and process requirements.

Drum 6 is constructed by arranging a plurality of tubular media 10 in a closely packed arrangement with their axes parallel to shaft 8 and binding the tubular media 10 with hoop bands 20. A singular media tube may optionally be bonded to adjacent tubular media in drum 6 by a suitable technique such as adhesive application or melt welding. As most clearly shown in FIG. 3, the media 10 are preferably grouped in four quadrants 1, 12, 13 and 14, each containing tubular media 10 which are bonded to each other and which are supported by spokes 16. The drum 6 has a length defined by that of tubular media 10 and a radius of preferably 12 inches to 24 inches.

Spokes 16 assist in supporting tubular media 10 and also maintain the tubular media 10 in their closely packed arrangement; however, tubular media 10 have sufficient structural strength to be self-supporting once they are bound with bands 20. Spokes 16 are preferably formed of a rigid material and have a length approximately equal to the radius of drum 6. The spokes 16 may be of any desirable cross-sectional shape and dimensions which will assist in maintaining the arrangement of tubular media 10. Most preferably, spokes 16 have a circular cross-section with a cross-sectional radius of about ⅜ inch. Preferably, each spoke 16 includes a threaded locking nut 17 which threadedly engages spoke 16 at threaded end 18.

Hoop bands 20 extend around the circumference of drum 6 and maintain the tubular media 10 in their closely packed arrangement. The drum 6 preferably includes about 5 hoop bands 20, which preferably are formed from a thin, flexible material such as stainless steel which may be wound and tightened around tubular media 10 to form the drum 6. Most preferably, at least some of the hoop bands 20 include spoke apertures 21 which receive threaded end 18 of spoke 16. When drum 6 is assembled, nut 18 is threaded onto end 17 of spoke 16 after end 17 is inserted in aperture 21. The nut 18 thereby locks hoop band 20 in place which maintains the media 10 in a closely packed arrangement.

Tubular media 10 are preferably formed from a material of high structural strength, such as high density polyethylene or polypropylene, and have a length approximately equal to that of shaft 8 which, as discussed above, is most preferably about 4 feet in length. The diameter of each of tubular media 10 is preferably between ⅜ inch and 2 inches.

Of particular importance with respect to the present invention is the void space and surface contact area of the tubular media 10. It has been unexpectedly discovered that tubular media having a void space of between about 88% and about 94% and a surface area of between about 30 ft²/ft³ and about 80 ft²/ft³ provides excellent nitrification of the contaminated water, assists in controlling the temperature of the contaminated water and resists bio-fouling.

Figure 4:
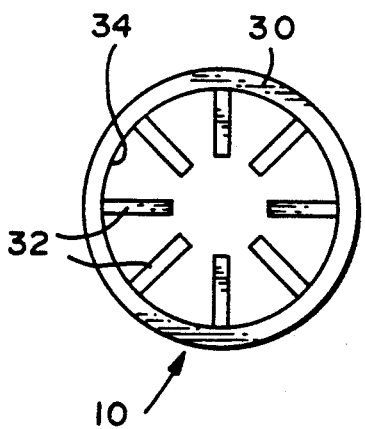
FIG. 4 is an end view of a single tubular medium constructed in accordance with the present invention.
Figure 5:
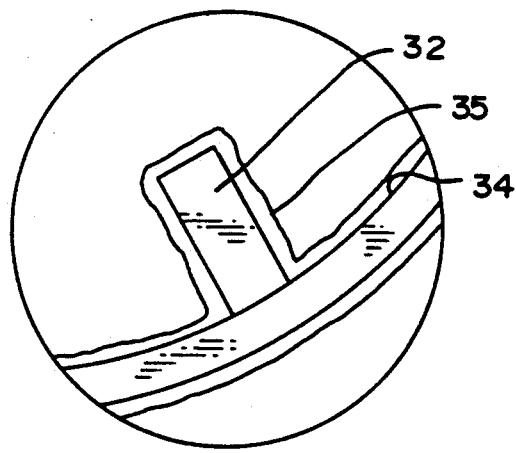
FIG. 5 is an enlargement of the encircled portion of FIG. 4.
Figure 6:
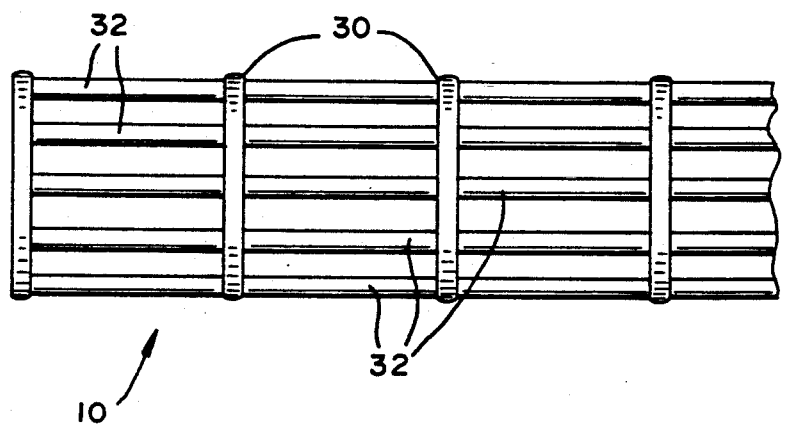
FIG. 6 is a side elevational view of the front portion of the tubular medium of FIG. 3.

FIGS. 4, 5 and 6 illustrate a preferred tubular media which exhibits the above-described parameters. This preferred tubular media is a form of a material which is commercially available from NSW Corporation of Roanoke, Virginia under the trademark NOR-PAC® and which is a random trickling filter media formed as a cylindrical nodule having a length approximately equal to its diameter. The tubular media 10 are preferably constructed from polyethylene and include a plurality of rings 30 spaced along their length and a plurality of integral internal fins 32 which extend radially inwardly from the inner surfaces 34 of rings 30. Four-foot lengths of tubing having a diameter of 2 inches and having eight fins equally spaced around the circumference thereof and constructed from this material are preferred and have a surface area of approximately 42 ft$^2$/ft$^3$.

Tubular media 10 supports the natural growth of a bacterial slime layer 35 on its surface. The layer 35 includes nitrifying bacteria such as nitrosomonas sp or nitrobacter sp for treating the contaminated water. The layer 35 is preferably formed by a conventional technique wherein an aqueous system inoculated with bacteria contacts the media and the bacteria attach to and grow on the media surface.

Figure 7:
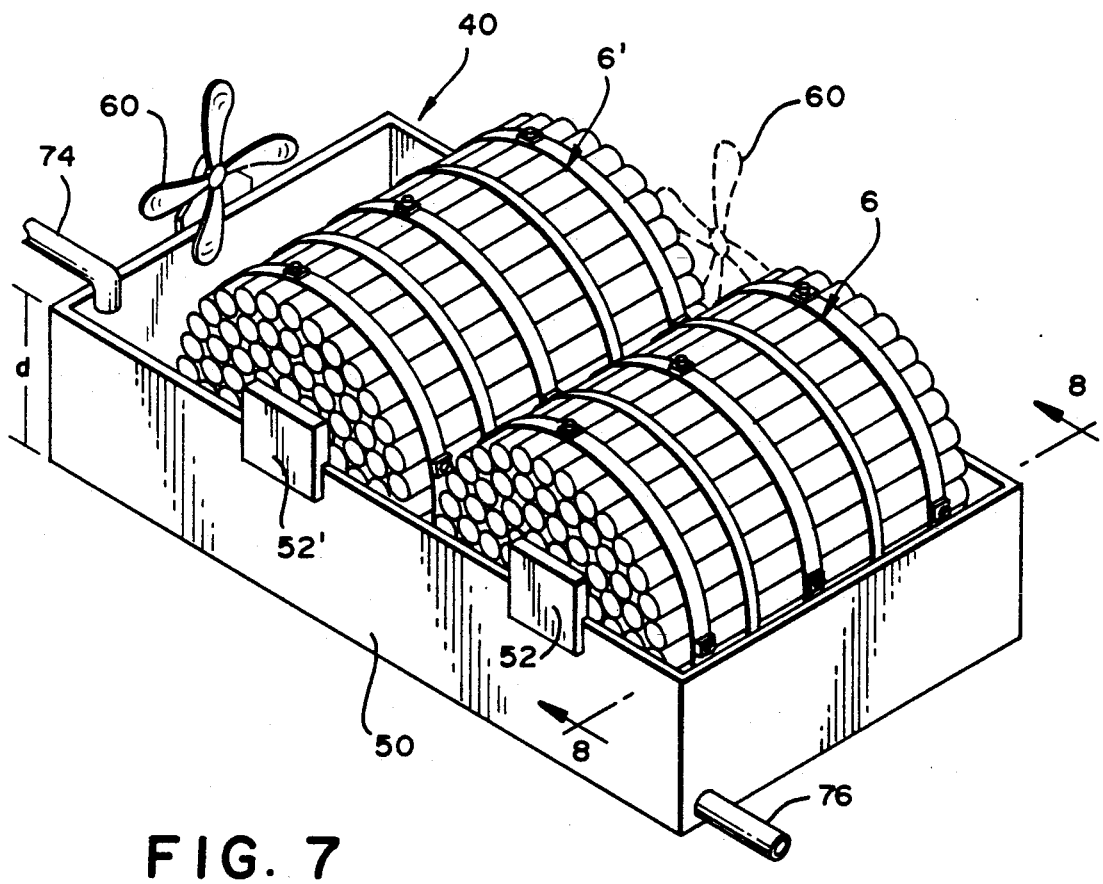
FIG. 7 is a diagrammatic perspective view of the rotating biological contactor system of the present invention.
Figure 8:
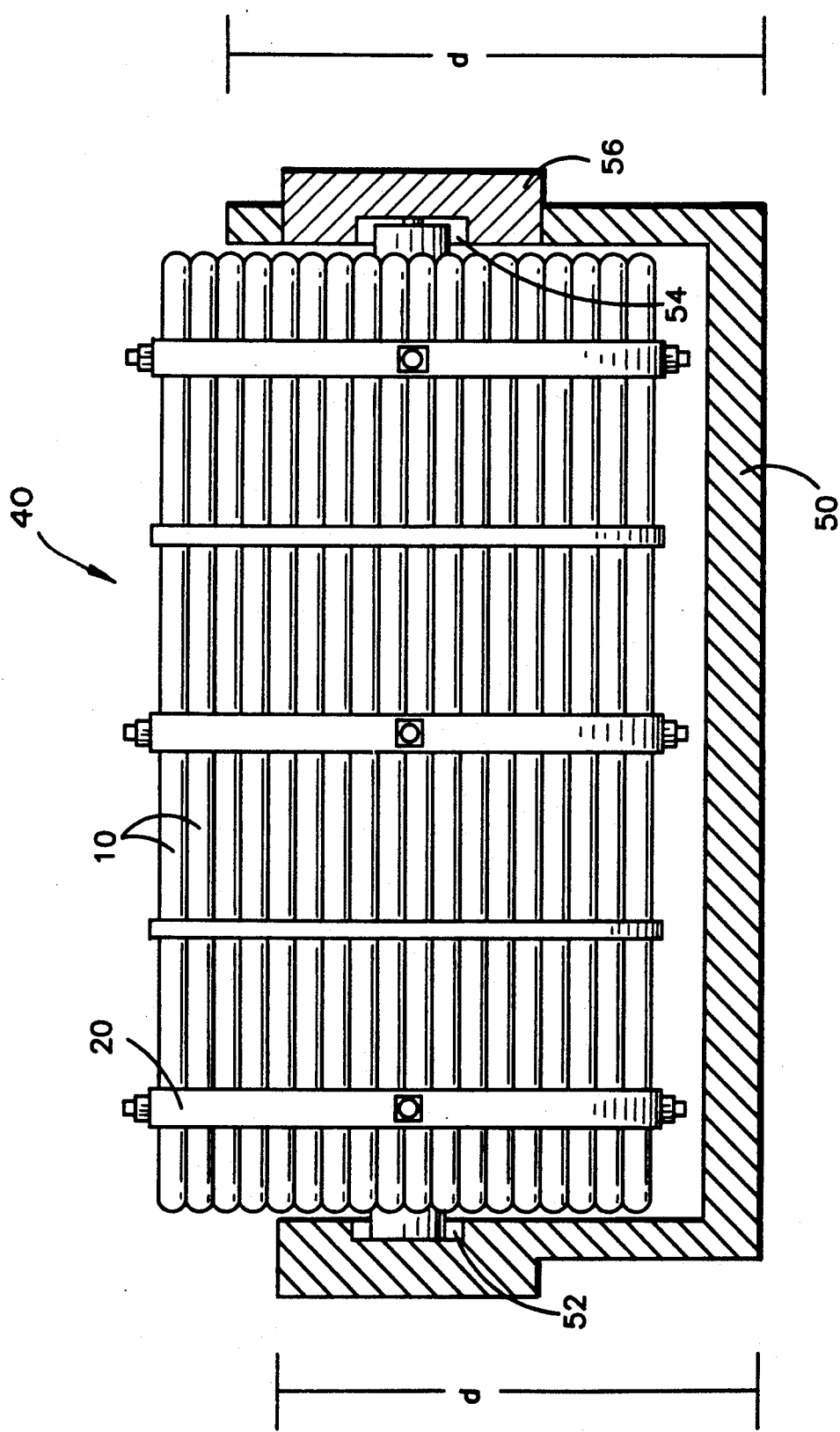
FIG. 8 is a side elevational view partially in cross section of the contactor of FIG. 7, with the cross section taken along line 8—8 of FIG. 7.

A rotating biological contactor including two contactor drums 6 and 6' of the type illustrated in FIG. 2, is shown in FIGS. 7 and 8, generally at 40. The drums are mounted on a water tank 50 having a depth d, the tank including shaft mounts 52, 54 and 52', 54' on opposite walls for receiving the ends of corresponding shafts 8 and 8' so as to allow rotation of drums 6 and 6' within the tank. A drive mechanism 56 is provided for rotating shaft 8 in mount 52, and a similar drive 56' is provided for shaft 8'. Any conventional drive mechanism may be utilized to rotate shafts 8 and 8'. Drive mechanisms 56 and 56' preferably are electric motors controlled by a suitable motor speed control (not shown). In the preferred embodiment shown in FIG. 7, two adjacent drums 6 and 6' are provided; however, any number of drums may be used, limited only by the size of the tank and the denitrification requirements of the user. The drums are mounted in tank 50 so that at least a portion of each drum, and preferably a portion of both drums extends the full depth d of tank 50, with the remainder of the drums extending above the surface of the liquid in the tank for contact with ambient air.

Optionally, tank 50 may have mounted thereon an air transport device 60 for positively circulating the surrounding air through the unsubmerged portion of the drum 25. Device 60 may be, for example, a conventional blower or fan which forces air through the contactor or a vacuum source which draws air through the contactor. The device 60 may be mounted on one side of tank 50 as shown in phantom in FIG. 7 so as to circulate air longitudinally through the length of tubular media 10 or on one end of the tank to circulate air transversely through the tubular media 10. A combination of air circulators 60 may also be utilized to circulate air in various directions.

In using the contactor of the present invention, contaminated water is introduced into tank 50 in an amount sufficient to partially submerge the portions of drums 6 and 6' which extend into the tank. The contactors are then rotated at a speed of about 2½ to about 5 rpm, thereby carrying the media tubular media 10 sequentially into and then out of the water, causing the bacteria carried by the media tubes to nitrify the contaminated water. This rotation also causes intimate contact between water, which clings to the media as the tubes move upwardly out of the tank, and the surrounding air. The air circulators 60 may be utilized to enhance this intimate contact. It has been unexpectedly discovered that the contactor of the present invention, while nitrifying the contaminated water, also maintains the temperature of the water at a temperature near the wet-bulb temperature of the surrounding air While not wishing to be bound by any theory, it is believed that this temperature maintenance is due to evaporative cooling of the water by the air. In evaporative cooling, the surface of the water is exposed to the air in varying degrees and heat transfer occurs. This heat transfer is dominantly due to latent heat transfer from vaporization of a small portion of the water, which occurs as the water temperature is driven toward the wet-bulb temperature of the air. Ideally, the wet-bulb temperature is the lowest temperature to which the water can be cooled. As a practical matter, the water temperature approaches but does not equal the wet-bulb temperature of the air.

When the temperature of the air surrounding the contactor is in the range of 90°-100° F., the temperature of a hot summer day, the wet-bulb temperature $T_B$ of the air will usually be 20° to 24° F. cooler, for a $T_B$ of 66° F. to 70° F. By operating the contactor of the present invention under these conditions, the water temperature can be maintained at a range which, as discussed previously, may be most suitable for the maximization of growth of a specific species, while utilizing no additional energy to refrigerate or otherwise cool the water with a heat exchanger.

Figure 9:
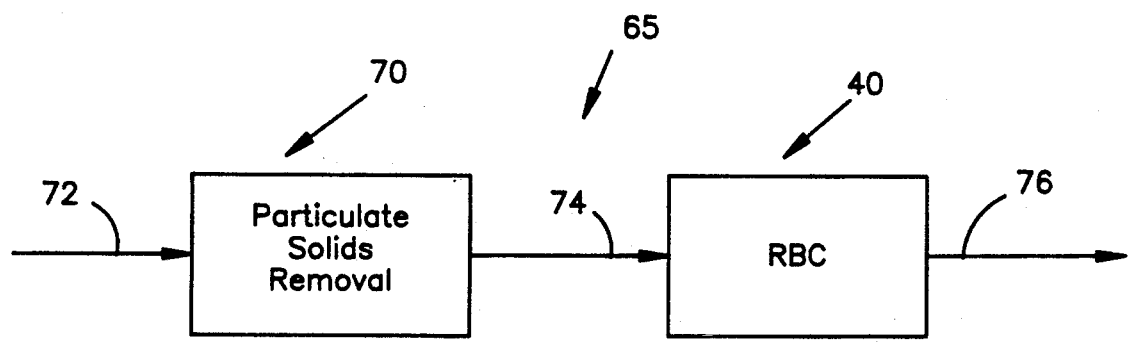
FIG. 9 is a schematic depiction of the water treatment system of the present invention.

The rotating biological contactor may be utilized in a water treatment subsystem 65 as shown in FIG. 9 for an aquaculture (fish-rearing) system. This water treatment subsystem 65 preferably includes a particle collector 70 for removing particulate solids from contaminated water supplied by way of inlet 72, with the filtered water then being supplied by way of flow path 74. Although collector 70 is shown in FIG. 8 as having a location upstream of contactor 40, it is to be understood that it may be located downstream of contactor 40 in outlet path 76. Most preferably, the collector is a foam fractionator; however, other positive collection devices, including filters, settling basins, cyclones, or combinations thereof may be used.

Figure 10:
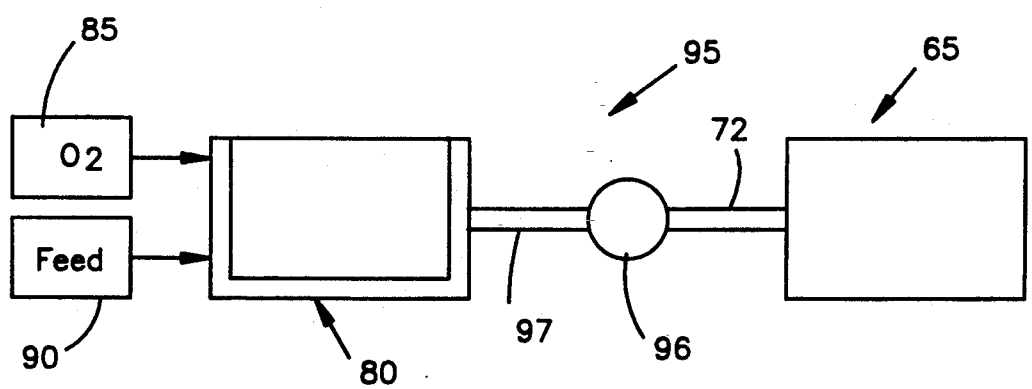
FIG. 10 is a schematic depiction of the aquaculture system of the present invention.

The water treatment subsystem 65 of the present invention may be combined with a fish management subsystem to form an aquaculture system for rearing fish as shown in FIG. 10. The fish management subsystem includes a number of conventional devices for rearing fish, including a fish rearing area 80 such as a tank or similar structure, an oxygen supply 85 and a feed supply 90. A water transfer system 95, such as a pump 96 for transferring water via conduit 97 to inlet 72, connects fish rearing area 80 to the water treatment subsystem 65.

In summary, the aquaculture system of the present invention includes a rotating biological contactor which nitrifies contaminated water, thereby removing materials toxic to fish, while also maintaining the water at a temperature necessary to maximize growth of fish reared in the system. Prevention of excessively high temperatures is achieved without the need for additional energy input for cooling and is therefore an economically valuable result which the present invention achieves by its novel structure.

What is claimed is:

1. Water treatment apparatus for recirculating water in a closed cycle aquaculture system for rearing fish, comprising:
   a fish rearing containment means including water;
   means supplying feed and oxygen to said water in said containment means; and
   water treatment means connected to said containment means to clean and nitrify said water and to maintain it at a selected temperature, said treatment means including:

a water tank for receiving water to be cleaned from said containment means;

a rotatable biological contactor mounted for rotation through water in said tank, said contactor comprising a drum having an axial support shaft and a plurality of media tubes surrounding said shaft and closely spaced thereto to form a packed, generally cylindrical bundle, a plurality of circumferential band hoops extending around said drum to secure said tubes, and a plurality of spokes extending radially from, and being secured at their inner ends to, said support shaft, said spokes being secured at their outer ends to said band hoops to maintain said closely packed bundle of media tubes;

each said media tube having a length approximately equal to the length of said support shaft, each tube having a longitudinal axis parallel to said axial shaft, and each tube incorporating a plurality of circumferential rings spaced along the length thereof with a plurality of integral longitudinal fins spaced around said tube and extending radially inwardly from said rings, said rings and fins providing a media tube having a surface area of between about 20 and 80 $ft^2/ft^3$ with a void space of between about 88% and 94%;

a bacterial film on said media tubes;

means for rotating said biological contactor shaft to cause said drum to rotate through water in said tank to thereby cause said media tubes to enter the water and thereafter exit the water; and means for directing a flow of air through said media tubes and through said media tube void spaces to cause air to contact water which clings to said media tubes.

2. A water treatment apparatus in accordance with claim 1 wherein said air directing means circulates air transversely through said tubular media.

3. A water treatment apparatus in accordance with claim 1 wherein said air directing means circulates air longitudinally through said tubular media.

4. A water treatment apparatus in accordance with claim 1 wherein said bacterial film includes a nitrifying bacteria.

5. A water treatment apparatus in accordance with claim 1 further comprising means for removing particulate solids.

* * * * *